United States Patent [19]
Celi

[11] Patent Number: 5,190,649
[45] Date of Patent: Mar. 2, 1993

[54] APPARATUS FOR WORKING UP METAL-CHARGED WASTE SLUDGES

[76] Inventor: Antonio M. Celi, D-5466, Neustadt, Im Engelsgarten 2, Fed. Rep. of Germany

[21] Appl. No.: 366,808

[22] Filed: Jun. 14, 1989

[30] Foreign Application Priority Data

Jun. 23, 1988 [DE] Fed. Rep. of Germany ....... 3821242

[51] Int. Cl.$^5$ .............................................. B01D 36/00
[52] U.S. Cl. .................................. 210/178; 210/179; 210/181; 210/182; 210/195.1; 210/202; 210/205; 210/259; 210/266; 210/319
[58] Field of Search ........ 210/634, 638, 688, 912–914, 210/770, 178, 179, 181, 182, 195.1, 202, 205, 208, 256, 259, 260, 266, 319; 366/57, 59, 227, 228, 318

[56] References Cited

U.S. PATENT DOCUMENTS

| | | | |
|---|---|---|---|
| 3,258,307 | 6/1966 | George | 210/634 |
| 4,280,925 | 7/1981 | Kiefer | 210/688 |
| 4,478,518 | 10/1984 | Tomyn | 366/227 |
| 4,539,111 | 9/1985 | Takacs et al. | 210/181 |
| 4,762,693 | 8/1988 | Schimmel et al. | 210/634 |

*Primary Examiner*—Ivars Cintins
*Attorney, Agent, or Firm*—W. Thad Adams, III

[57] ABSTRACT

The invention relates to a method of removing metals from metal-charged waste sludges from industry, clarification plants, or the like, in which the sludges are treated with a solvent for the metals, the resulting solution is separated from the undissolved substances and worked up to yield the metals, and the remaining solids are dumped as safe waste materials or used as fertilizers. The invention also relates to an apparatus for carrying out this working-up method, characterized by a mixing apparatus for mixing the solvent and the sludge which is to be treated, a residence zone, an adjoining apparatus for separating the metal-charged solvent from the insoluble fraction, and optionally an apparatus for drying the insoluble fraction. Metal sludges can be continuously worked up, if desired, in the apparatus according to the invention.

7 Claims, 2 Drawing Sheets

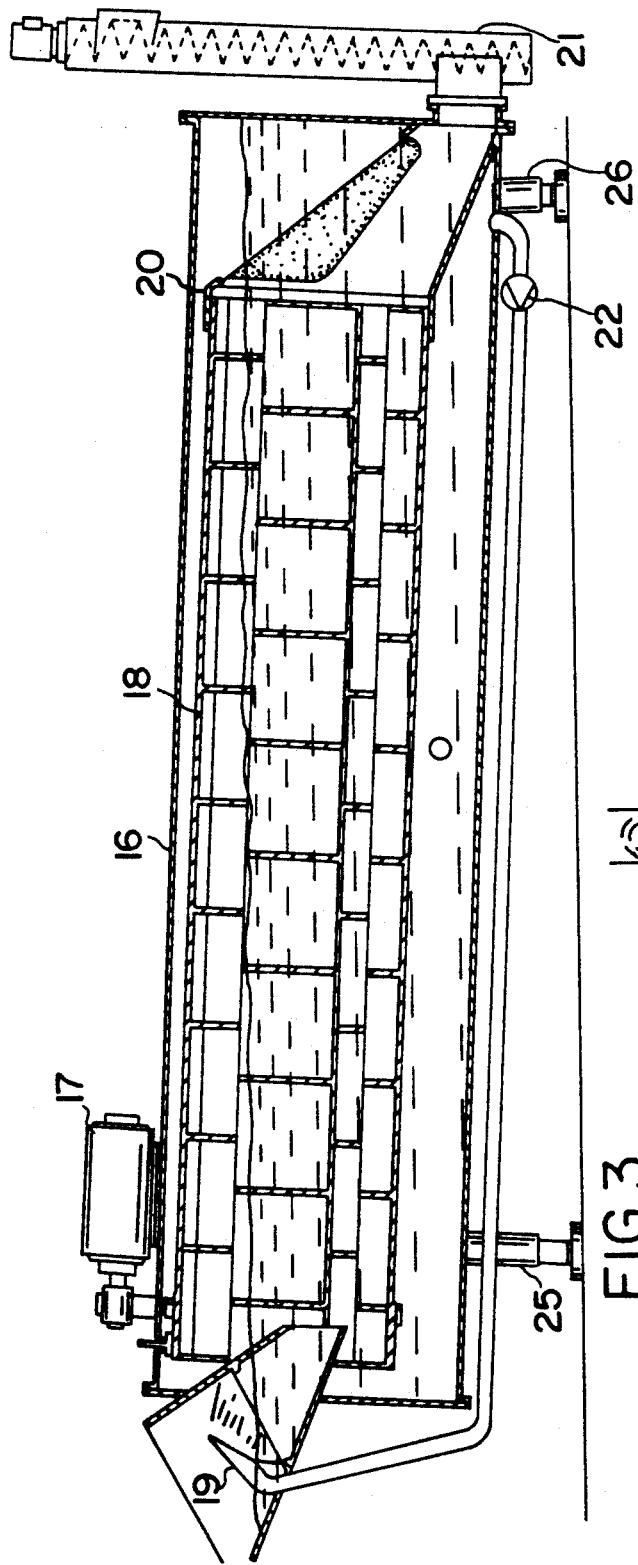
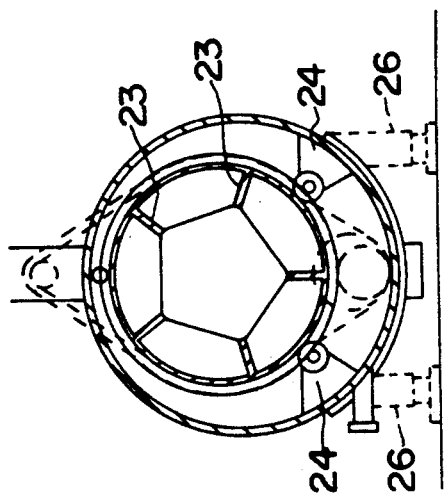
FIG.3
FIG.4

APPARATUS FOR WORKING UP METAL-CHARGED WASTE SLUDGES

The invention relates to a method and an apparatus for working up metal-charged waste sludges, such as are produced in industry, for example the electronics and electrodeposition industries, or else in clarification plants. The method is in addition suitable for working up soil which has been charged with metal as the result of accidents.

The disposal of such waste materials constitutes a great problem, since these waste materials are formed in relatively large volumes and, because of their poisonous nature due to the metal content, can be dumped only in special refuse dumps.

The use of, for example, sewage sludge as a fertilizer in fields, as was the practice even a few years ago, has proved to be extremely dangerous because the metals deposited on the fields together with the sewage sludge are absorbed by plants and thus pass into the human food chain.

However, because of the limited capacity of special refuse dumps, disposal at such dumps is not possible on an adequate scale.

The object of the present invention is therefore to provide a method and an apparatus for working up metal-charged waste materials, whereby on the one hand the metals can be recovered as valuable raw materials from these waste materials, while however on the other hand the waste materials themselves are brought into a safe form, so that they can either be dumped at normal dumps or can be used as safe fertilizers for agricultural purposes.

According to the invention this object is achieved with a method of removing metals from metal-charged waste sludges from industry, clarification plants, or the like, which is characterized in that the sludges are treated with a solvent for the metals, the resulting solution is separated from undissolved solids and worked up to yield the metals, and the remaining solids are dumped as safe waste materials or used as fertilizers.

A method of this kind permits batch or continuous working.

The solvent used in the method according to the invention depends to a great extent on the metals which have to be dissolved.

An aqueous solution of ammonium chloride and sodium sulphate has been found particularly advantageous for the treatment of the sludges. A solution of this kind dissolves quite a number of metals from such waste sludges and enables these metals to be recovered with the aid of ion exchangers or else by electrolytic methods.

It has been found very expedient for the metal-containing sludges which are to be worked up to be treated countercurrently to the solvent.

The solution separated from the solids is expediently freed of the metals in an ion exchange process and used again for treating other sludges.

In order to achieve better and quicker dissolution of the metals contained in the sludges, it has been found very expedient to add hydrogen peroxide to the above-mentioned solution of ammonium chloride and sodium sulphate.

The method according to the invention for the treatment of sludge and the working up and recovery of the solvent can expediently be carried out continuously.

The treatment time and also the treatment temperature will be selected in dependence on the nature of the metal to be recovered from the sludges. A raising of the temperature usually shortens the time required for the dissolution of the metals and thus also shortens the method according to the invention.

The apparatus developed for carrying out the method according to the invention consists of a mixing apparatus for mixing the solvent and the sludge which is to be treated, a residence zone of adequate dimensions to allow the solvent to act on the sludge for a sufficiently long time, as well as an adjoining apparatus for separating the metal-charged solvent from the insoluble fraction, and optionally an apparatus for drying the insoluble fraction.

In addition, for the purpose of separating the dissolved metal from the solvent a special separator may optionally be provided, consisting for example of an ion exchanger, an electrolysis apparatus, or the like.

It has been found very expedient for the mixing apparatus for mixing the solvent and the sludge which is to be treated to consist of a rotating container provided on its inside wall with so-called lifter blades by which on the rotation of the container the sludge in each case is raised and moved through the solvent.

The container expediently consists of an elongated rotating drum provided at one end with an opening for the introduction of the sludge and at the other end with a discharge opening for the insoluble fraction. The lifter blades are expediently disposed in this drum in such a manner that on the one hand they ensure that the sludge introduced for working up therein is always moved in the solution, while on the other hand they also bring about a continuous movement of the sludge through this drum to the discharge opening.

In this connection it has been found particularly expedient for this rotating drum to be disposed so that it rises towards the discharge opening.

This has the consequence that the liquid level of the solvent does not quite reach the discharge opening and that the insoluble material is separated in this region from the solution.

In the region of the discharge opening it is expedient to provide a filter tray on which the insoluble material carried to the discharge opening is separated from the solution, which filter tray surrounds the drum wall.

The insoluble material separated in this manner is carried away by means of an appropriate conveyor device, optionally dried, and either deposited on normal dumps or used as fertilizer for agricultural purposes, in which case the ammonium sulphate originating from the solvent is likewise useful as an advantageous fertilizer.

The apparatus according to the invention is expediently so constructed that the metal-charged solvent is continuously drawn off, passed through an ion exchanger, and then recycled into the rotating drum.

In order to achieve countercurrent extraction, it has been found expedient to provide the inlet opening for the regenerated solvent in the region of the discharge opening for the insoluble material and to provide the outlet opening for the metal-charged solution in the region of the sludge inlet opening.

In this way the insoluble material discharged from the drum is rewashed with the freshly regenerated solvent, for example by spraying on the filter tray, so that any last residues of metal-containing solvent are also removed from it.

Since the temperature of the solution is of substantial importance for the dissolution of the metal components in the sludge being worked up, according to another advantageous embodiment of the present invention it has been found expedient to provide a heater in the solvent circuit.

By means of this heater the temperature can be varied between room temperature and the boiling point of the solvent, that is to say usually 100° C.

A heater of this kind may expediently consist of a suitable heat exchanger operated in the usual manner.

Another relatively simple apparatus for carrying out the method according to the invention is characterized in that the mixing apparatus consists of an inclined stationary container on the bottom of which is provided a rotating conveyor worm for conveying the sludge from the inlet opening to the discharge opening at the higher end of the container where a sieve tray is provided. This conveyor worm simultaneously also brings about a continuous movement of the sludge being worked up and contact between the sludge and the solvent.

With the aid of the exemplary embodiments illustrated in the accompanying drawings the apparatus according to the invention for the removal of metals from metal-charged waste sludges will now be explained in detail.

In the drawings:

FIG. 3 shows a special embodiment of the invention, in which a rotating mixing drum is disposed eccentrically in a stationary drum, and FIG. 4 is a section through the apparatus shown in FIG. 3.

Figure 1:
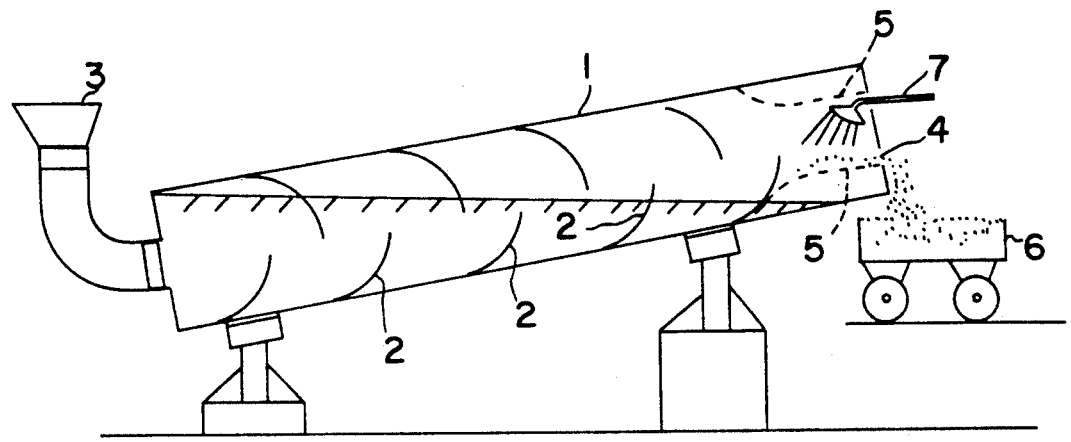
FIG. 1 shows an apparatus according to the invention which works with a rotating drum.

In the embodiment illustrated in FIG. 1 the drum is rotatable about its longitudinal axis and disposed with a certain inclination in such a manner that the liquid level of the solvent inside the drum just reaches to a point slightly below the discharge opening. In the interior of the drum 1 are disposed so-called lifter blades 2, which on the rotation of the drum 1 have the effect that on the one hand the sludge introduced through the charging opening 3 is continuously brought into contact with the solvent contained in the drum, and on the other hand that the insoluble fraction is conveyed to the discharge opening 4. The end of the drum 1 in the region of the discharge opening 4 is provided with a sieve tray 5, which is disposed concentrically to the axis of the drum and through which the insoluble material passes out of the drum and drops into a transport truck 6. On its way into the transport truck 6 via the sieve tray 5 the insoluble material is sprayed by a spray device 7 with freshly regenerated solvent, and in this way is further freed of metal-containing solvent.

The solvent charged with metal is expediently removed via the charging opening 3, from which the solvent is passed through an ion exchanger (not shown), then being fed back to the drum via the spray device 7.

Figure 2:
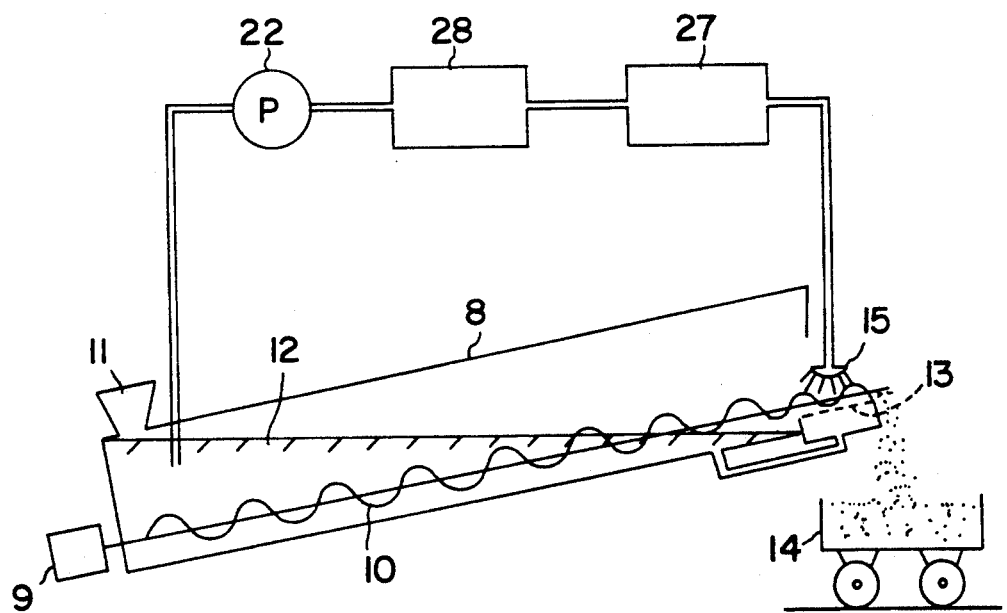
FIG. 2 shows an apparatus working with a stationary drum and a conveyor worm disposed therein.

In the embodiment shown in FIG. 2 the mixing drum 8 is mounted stationary and is provided with a conveyor worm 10 which is driven by a motor 9 and which is mounted on the base of said drum and on the one hand continuously brings the sludge introduced through the filling opening 11 into contact with the solvent 12 contained inside the drum, while on the other hand said worm conveys the undissolved material to the discharge opening, where it passes out by way of a sieve tray 13 and drops into a transport truck 14.

On the sieve tray 13 the undissolved material can expediently be sprayed by a spray device 15 with freshly regenerated solvent, and thus freed of any metal-charged solvent still adhering to it.

The regeneration of the metal-charged solvent drawn off at the charging end is expediently effected likewise with the aid of an ion exchanger 28, from which the freshly regenerated solvent is fed back to the drum via the spray device 15, optionally being further heated in the heater 27. In the special embodiment illustrated in FIGS. 3 and 4 a mixing drum 18 adapted to be driven by a motor 17 is disposed eccentrically in a correspondingly dimensioned tube 16, and is provided with a charging charging opening 19 for the sludge which is to be worked up and with a discharge opening 20 for the insoluble material.

The insoluble material passing out of the drum is carried away by means of a conveyor worm 21. The solvent used to dissolve the metals is circulated by a pump 22 and optionally after regeneration in an ion exchanger is recycled to the drum 18 through the charging opening 19.

Over its whole length the drum 18 is provided with ribs 23. The drum 18 turns, in this arrangement, on the roller bearings 24, the speed of rotation of the drive motor 17 being adjustable. The amount of metal-containing sludge to be worked up which is conveyed through the drum 18 depends on the speed of rotation of the drum 18, the number of ribs 23 and the inclination of the entire system, this inclination being variable by means of the adjustable feet 25 and 26 and adaptable to individual requirements.

If almost completely soluble metal-containing sludges are worked up in the apparatus according to the invention, it is expedient to use solutions of aluminium chloride and sodium sulphate. Insoluble residual substances which are carried away by the conveyor worm 21 are then deposited in special refuse dumps.

If on the other hand clarified sludge or metal-charged soil is to be worked up, it will be expedient to use ammonium sulphate solutions. In cases where some metals contained in the sludges or in the soil cannot be dissolved forthwith, a small amount of hydrogen peroxide is sufficient to enable these materials also to be dissolved. The ammonium sulphate used as washing agent leads to a substantially metal-free clarification sludge residue or metal-free soil, as the case may be. On leaving the cleaning devices by way of a band filter press or a hydrocyclone, the material is dried as much as possible and then reused with a certain proportion of ammonium sulphate as a fertilizer for agricultural purposes.

Through the method according to the invention and the apparatus developed according to the invention for carrying out this method, a working up of metal-charged waste materials, which hitherto in their voluminous form could be accommodated only in special refuse dumps, is thus now possible in a very simple manner in a continuous operation.

I claim:

1. An apparatus for removing metals from metal charged waste sludges with an aqueous solution of ammonium chloride and sodium sulfate comprising:
   (a) a mixing apparatus for mixing the aqueous solution of ammonium chloride and sodium sulfate together with the waste sludges, said mixing apparatus including a rotating container having an elongated rotating drum with lifter blades on the inside wall thereof mounted for movement towards a discharge opening in one end thereof;

(b) a residence zone in the rotating drum for holding the sludge during treatment;

(c) an inlet opening on one end of the mixing apparatus for the introduction of sludges into the mixing apparatus on the end opposing the discharge opening for removing separated undissolved solids from the mixing apparatus upon completion of the metal removal;

(d) a separating apparatus for separating the metal charge solution from the undissolved solids and comprising a filter tray positioned in said mixing apparatus in the region of the discharge opening for carrying the separated solids to the discharge opening; and (e) a drying apparatus for drying the separated undissolved solids.

2. An apparatus according to claim 1, wherein an inlet is provided in the region of said discharge opening for the separated solids and an outlet is provided in the region of the sludge inlet opening for the metal-charged solution.

3. An apparatus according to claim 2, wherein said outlet for the metal-charged solution includes a liquid sprayer directed onto said filter tray for spraying the metal-charged solution onto said separated solids.

4. An apparatus according to claim 3 and including a heater for heating the aqueous solution.

5. An apparatus according to claim 1, wherein said lifter blades are shaped to continuously move sludge to the discharge opening of the rotating container.

6. An apparatus according to claim 1 including
   (a) discharge means for continuously drawing off the metal-charged aqueous solution;
   (b) ion exchange means carrying out an ion-exchange process on said aqueous solution; and
   (c) recycling means for recycling said solution back into said rotating container.

7. An apparatus according to claim 1, wherein said mixing apparatus includes an inclined elongated stationary container on the bottom which is provided a rotating conveyor worm for conveying sludge from said inlet opening to said discharge opening, said discharge opening being positioned at the higher end of said container, and a sieve tray for assisting and separating said undissolved solid from said solution.

* * * * *